United States Patent
Lai et al.

(10) Patent No.: US 7,477,423 B2
(45) Date of Patent: Jan. 13, 2009

(54) MULTI-FUNCTION PERIPHERALS

(75) Inventors: Chung-Yi Lai, Taitung (TW); Chung-Yi Cheng, Taichung (TW)

(73) Assignee: Lite-On Technology Corporation, Taipei (TW)

( * ) Notice: Subject to any disclaimer, the term of this patent is extended or adjusted under 35 U.S.C. 154(b) by 1018 days.

(21) Appl. No.: 10/615,793

(22) Filed: Jul. 10, 2003

(65) Prior Publication Data

US 2004/0179244 A1    Sep. 16, 2004

(30) Foreign Application Priority Data

Mar. 11, 2003   (TW) ............................. 92203707 U

(51) Int. Cl.
*H04N 1/024* (2006.01)
*H04N 1/04* (2006.01)
*H04N 1/40* (2006.01)

(52) U.S. Cl. .................. 358/472; 358/498; 358/471; 358/496

(58) Field of Classification Search ............... 358/472, 358/498, 471, 496, 474; 399/367
See application file for complete search history.

(56) References Cited

U.S. PATENT DOCUMENTS

| 5,206,737 | A | * | 4/1993 | Sugiyama | 358/296 |
| 5,624,196 | A | * | 4/1997 | Jackson et al. | 400/625 |
| 5,954,326 | A | * | 9/1999 | Gaarder et al. | 271/9.02 |
| 6,519,047 | B1 | * | 2/2003 | Ahn | 358/1.12 |
| 7,151,622 | B2 | * | 12/2006 | Suzuki et al. | 358/498 |

* cited by examiner

*Primary Examiner*—Houshang Safaipour
(74) *Attorney, Agent, or Firm*—Rabin & Berdo, P.C.

(57) ABSTRACT

A multi-function peripheral includes a casing, a scanning module and a printing module. The casing has a recording media path. The scanning module is located on the recording media path for selectively scanning recording media fed into the casing from the recording media path. The printing module also is located on the recording media path for selectively printing the recording media. The recording media are then discharged out of the casing through the recording media path. Thus the multi-function peripheral can reduce the number of elements, simplify replacement of the inkjet cartridge of the printing module, reduce the dimensions, lower the element cost and diminish the complexity of the mechanisms.

5 Claims, 4 Drawing Sheets

MULTI-FUNCTION PERIPHERALS

FIELD OF THE INVENTION

The invention relates to multi-function peripherals that integrate copying, printing, facsimiling and scanning devices to perform copying, printing, facsimiling and scanning functions.

BACKGROUND OF THE INVENTION

Nowadays business and administrative tasks in offices are closely tied to business devices such as copiers, printers, facsimile machines and scanners. These business devices have become indispensable information equipment in modern office environments.

Each business device needs an installation space. There is always a space allocation problem for these devices. Each business device has different utilization. Some business devices may have a low utilization, but they still have to be purchased to meet possible requirements.

In order to remedy the problems set forth above, Multi-Function Peripherals (MFP) have been developed and introduced. These MFPs integrate the functions of copying, printing, FAX, scanning, etc. Thus merely one MFP can process multiple office tasks. It can save a lot of space and cost However, most conventional MFPs now being used merely distribute a variety of functional modules throughout various locations in the MFP to perform each function individually. In short, they merely put various modules together rather than adopt a new design in an integrated fashion. FIG. 1 illustrates a conventional printing module and a scanning module. These two sets are located on two sites of the MFP. The printing module has a panel to guide paper to a flat glass board. The printing module performs printing functions and discharges the paper. The scanning module also has a panel to guide paper. After having finished the scanning function, the scanner module discharges the paper. The MFP adopting such a design has the following disadvantages:

1. The inkjet cartridge used in the printing module is difficult to replace.
2. It has larger dimensions. As it uses more elements (including redundant components), it needs more space.
3. The element costs are higher. As it uses more elements (including redundant components), the cost for the elements is higher.
4. The design of the mechanism is more complicated. Since it does not integrate various modules, many elements are redundant.

SUMMARY OF THE INVENTION

In view of the aforesaid disadvantages, the primary object of the invention is to provide a multi-function peripheral (MFP) that disposes a scanning module and a printing module on a recording media path to reduce redundant elements and thereby simplify replacement of the inkjet cartridge, reduce the dimensions, lower the element cost and diminish the complexity of the mechanisms.

The MFP of the invention includes a casing, a transparent board, a scanning module and a printing module. The casing has a recording media path with two ends forming respectively a recording media inlet and a recording media exit located on the exterior of the casing for receiving media into the casing and discharging the media out of the casing. The transparent board is located on the recording media path and is adjacent to the recording media inlet. The scanning module is located on the transparent board for scanning the recording media. The printing module is located on the recording media path and is adjacent to the recording media exit for printing the recording media. The recording media moves on the recording media path and is discharged outs of the casing through the recording media exit.

Thus when the invention performs scanning and printing functions, i.e. processes scanning on a recording medium then prints the scanning result on another recording medium, the recording medium may be fed through the recording media inlet into the casing and to be moved to the transparent board corresponding to the scanning module. The scanning module scans the recording medium, and the recording medium is moved on the recording media path to the recording media exit to be discharged out of the casing. Thereafter, another recording medium is fed into the casing through the recording media inlet on the recording media path and is printed upon by the printing module. Finally, another recording medium is discharged out of the casing through the recording media exit.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
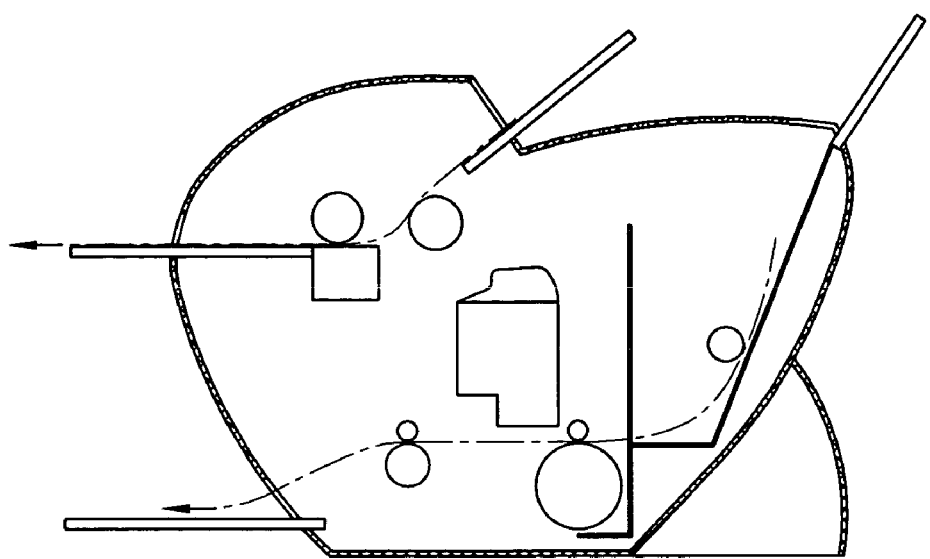
FIG. 1 a schematic sectional view of a conventional MFP.
Figure 2:
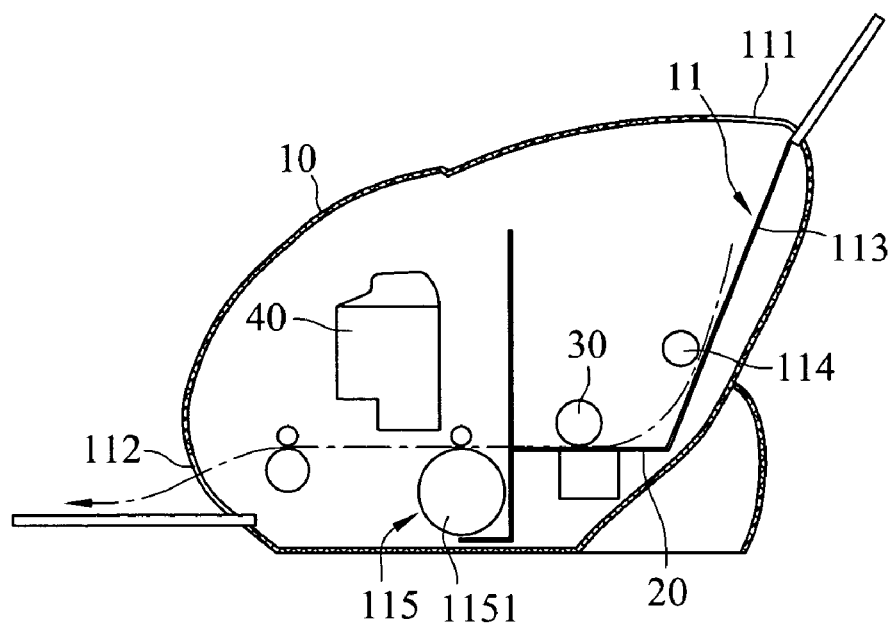
FIG. 2 is a schematic sectional view of the invention.
Figure 3:
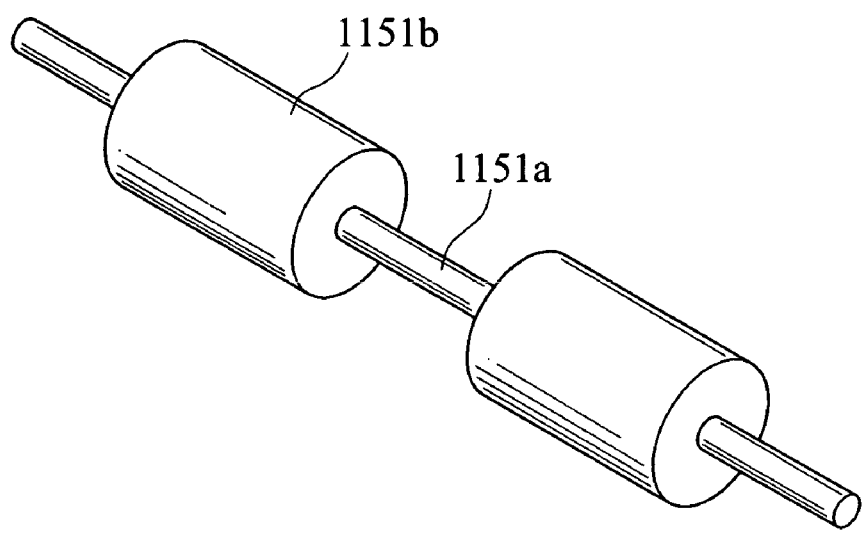
FIG. 3 is a schematic view of the roller of the invention.
Figure 4A:
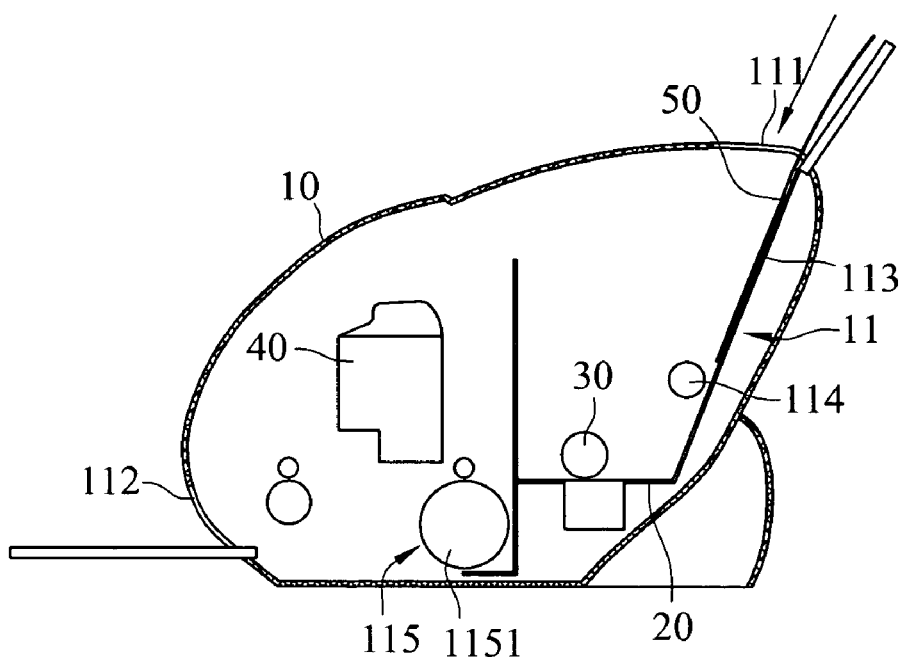
FIGS. 4A through 4D are schematic views of the invention performing scanning and printing functions.
Figure 4B:
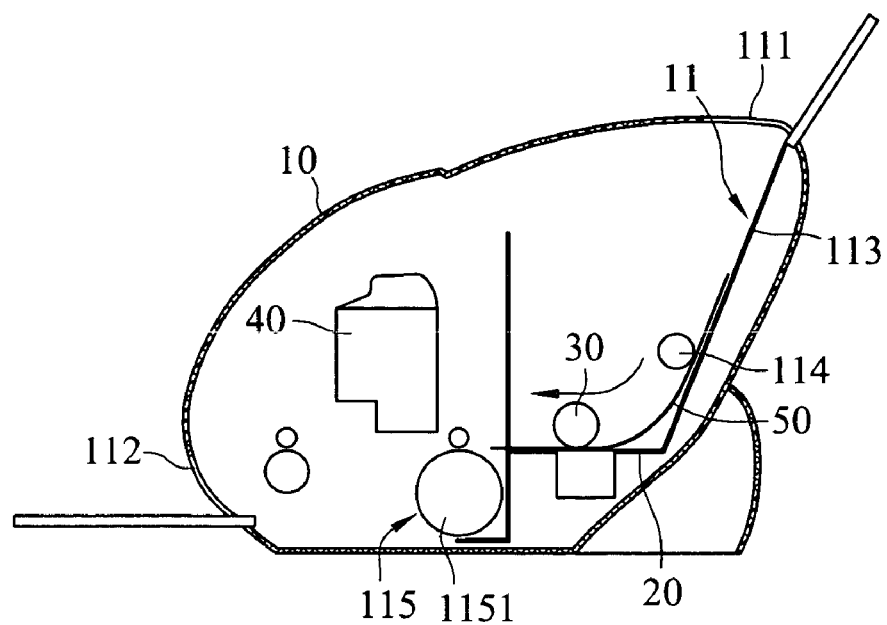
Figure 4C:
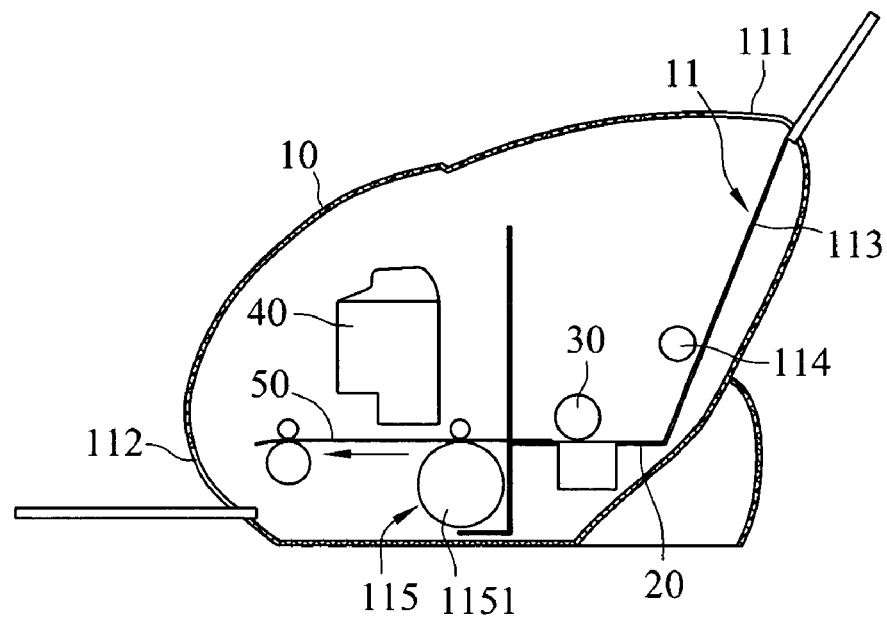
Figure 4D:
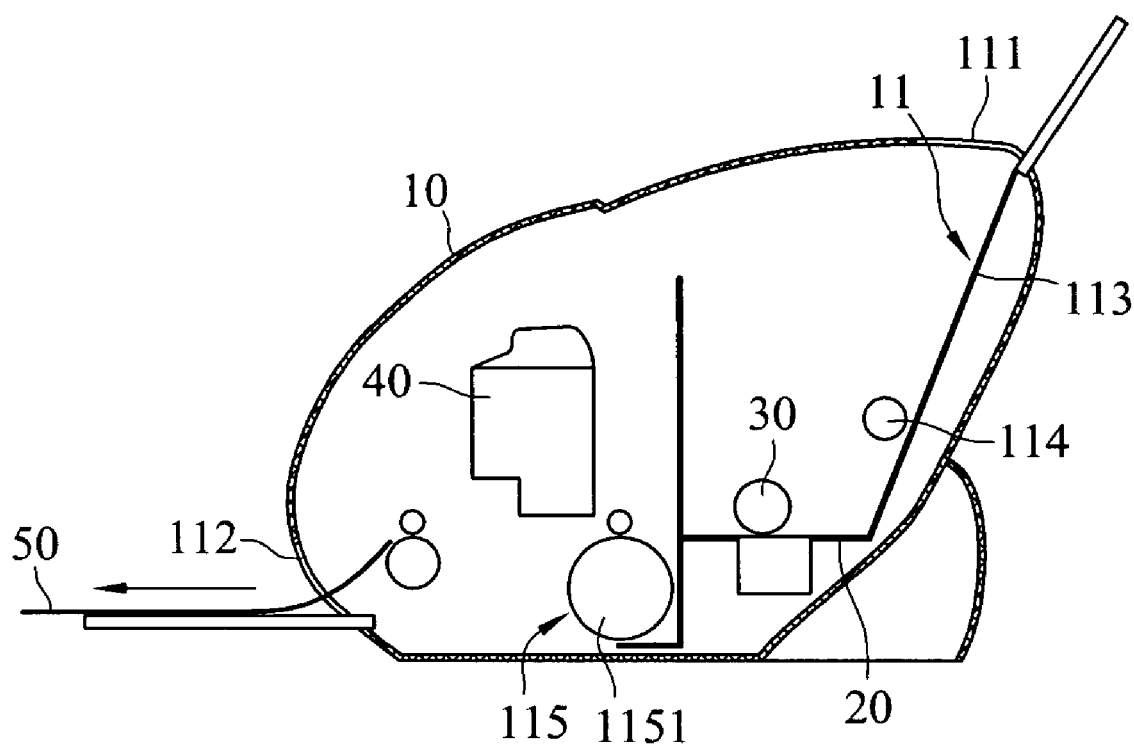

Referring to FIG. 2, the multi-function peripheral (MFP) according to the invention includes a casing 10, a transparent board 20, a scanning module 30 and a printing module 40. The casing 10 houses the transparent board 20, scanning module 30 and printing module 40, and has a recording media path 11 which has two ends forming respectively a recording media inlet 111 and a recording media exit 112 located on the exterior of the casing 10 for receiving media 50 (also referring to FIG. 4A, the recording media may be paper or projection film or the like) into the casing 10 and discharging the recording media out of the casing 10. The recording media path 11 includes a panel 113, and a depressing member 114. The depressing member 114 depresses the recording media 50 on the panel 113 to allow the recording media 50 to be moved on the panel 113. A guiding means 115 is located on the recording media path 11 and includes a roller 1151, which has an axle 1151a with a pressing element 1151b mounting thereon (also shown in FIG. 3). The roller 1151 has a gap and may rotate to channel the recording media 50 to pass through.

The transparent board 20 is a flat glass board located on the recording media path 11 and is adjacent to the recording media inlet 111. The scanning module 30 is located on the transparent board 20 for selectively scanning the recording media 50. Hence when the recording media 50 are moved on the panel 113 along the recording media path 11 to the scanning module 30, the scanning module 30 scans on the recording media 50. The printing module 40 is located on the recording media path 11 and is adjacent to the recording media exit 112 for selectively printing the recording media 50. Of course, during printing, the guiding means 115 on two sides of the printing module 40 maintain the recording media 50 in a flat condition to facilitate printing. Then the recording media 50 are moved along the recording media path 11 and discharged out of the casing 10 through the recording media exit 112.

When using the invention to perform the functions of scanning and printing, i.e. scanning a recording medium 50 and printing the scanning result on another recording medium 50 as shown in FIGS. 4A through 4D, first insert the recording medium 50 through the recording media inlet 111 of the recording media path 11 into the casing 10. Next, the depressing member 114 depresses the recording medium 50 on the panel 113 so that the recording medium 50 may be moved along the panel 113 to the transparent board 20 corresponding to the scanning module 30. The scanning module 30 scans the recording medium 50, then the recording medium 50 passes through the printing module 40 and is moved on the recording media path 11 to the recording media exit 112 to be discharged out of the casing 10. Thereafter, another recording medium 50 passes through the scanning module 30 in the same way set forth above (but without scanning). The roller 1151 of the guiding means 115 channels another recording medium 50 between two sets of rollers 1151. The pressing element 1151*b* is driven by the axle 1151*a* to rotate; another recording medium 50 is clipped in a flat manner by the guiding means 115 on two sides of the printing module 40. Then the printing module 40 prints on another recording medium 50. Finally, another recording medium 50 is moved on the recording media path 11 and discharged out of the casing 10 through the recording media exit 112.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multi-function peripheral, comprising:
    a casing having a recording media path which has two ends forming respectively a recording media inlet and a recording media exit located on the exterior of the casing for receiving recording media into the casing and discharging the recording media out of the casing;
    a transparent board located on the recording media path and adjacent to the recording media inlet;
    a scanning module located on the transparent board for selectively scanning the recording media;
    a printing module located on the recording media path and adjacent to the recording media exit for selectively printing the recording media, the recording media being moved on the recording media path and discharged out of the casing through the recording media exit; and
    a plurality of guiding means located on the recording media path and on two sides of the printing module to maintain flatness of the recording media for printing, the guiding means including at least two rollers between the printing module and the scanning module, the rollers having a gap formed therebetween to allow the recording media to pass through by rolling, each of the rollers including an axle with a plurality of pressing elements mounted thereon for channeling the recording media to move in a rolling fashion.

2. The multi-function peripheral of claim 1, wherein the recording media path further includes a panel and a depressing member, the depressing member depressing the recording media on the panel so that the recording media is moved on the recording media path to the scanning module.

3. The multi-function peripheral of claim 1, wherein the transparent board is a flat glass board.

4. The multi-function peripheral of claim 1, wherein the scanning module and the printing module are spaced apart from each other along the recording media path in a direction along which the recording media moves.

5. The multi-function peripheral of claim 4, wherein the scanning module and the printing module face the same side of the recording media path.

* * * * *